(12) United States Patent
Sato

(10) Patent No.: US 12,049,147 B2
(45) Date of Patent: Jul. 30, 2024

(54) HYBRID ELECTRIC VEHICLE

(71) Applicant: NISSAN MOTOR CO., LTD., Yokohama (JP)

(72) Inventor: Seiichi Sato, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 311 days.

(21) Appl. No.: 17/614,893

(22) PCT Filed: May 31, 2019

(86) PCT No.: PCT/JP2019/021663
§ 371 (c)(1),
(2) Date: Nov. 29, 2021

(87) PCT Pub. No.: WO2020/240804
PCT Pub. Date: Dec. 3, 2020

(65) Prior Publication Data
US 2022/0234456 A1 Jul. 28, 2022

(51) Int. Cl.
| | |
|---|---|
| *H02K 11/33* | (2016.01) |
| *B60K 6/40* | (2007.10) |
| *B60L 53/22* | (2019.01) |
| *H02K 5/22* | (2006.01) |
| *H02K 7/00* | (2006.01) |
| *B60K 6/46* | (2007.10) |

(52) U.S. Cl.
CPC ............... *B60L 53/22* (2019.02); *B60K 6/40* (2013.01); *H02K 5/225* (2013.01); *H02K 7/006* (2013.01); *H02K 11/33* (2016.01); *B60K 6/46* (2013.01); *B60L 2210/10* (2013.01)

(58) Field of Classification Search
CPC ........ H02K 11/33; H02K 5/225; H02K 7/006; B60K 6/405; B60K 6/40; B60L 53/22
See application file for complete search history.

(56) References Cited

U.S. PATENT DOCUMENTS

| | | | |
|---|---|---|---|
| 11,492,044 B2* | 11/2022 | Shimokouchi | B62D 21/152 |
| 2009/0294626 A1* | 12/2009 | Abe | B60L 3/0007 248/674 |

FOREIGN PATENT DOCUMENTS

| | | |
|---|---|---|
| JP | 2001-97052 A | 4/2001 |
| JP | 3843702 B2 | 11/2006 |

(Continued)

OTHER PUBLICATIONS

JP-2014097727-A machine translation on Dec. 2, 2023.*

*Primary Examiner* — Leda T Pham
(74) *Attorney, Agent, or Firm* — Foley & Lardner LLP

(57) ABSTRACT

A generator of a hybrid electric vehicle is electrically connected with an inverter by a harness. A generator opening is opened on a generator housing, and an inverter opening is opened on an inverter housing. The harness extends between the generator opening and the inverter opening. The harness is led out from the inverter opening in a first direction toward the generator. The harness is led out from the generator opening in a second direction that is different from the first direction. The inverter opening is set off with respect to the generator opening in the second direction, and at least a portion of the harness extends between the generator housing and the inverter housing. The harness necessarily flexes, and thereby deters transmission of vibrations from the generator to the inverter.

2 Claims, 3 Drawing Sheets

(56) References Cited

FOREIGN PATENT DOCUMENTS

| | | | |
|---|---|---|---|
| JP | 2013-51848 | A | 3/2013 |
| JP | 2013-82339 | A | 5/2013 |
| JP | 2013-133019 | A | 7/2013 |
| JP | 2014-097727 | A | 5/2014 |
| JP | 2014097727 | A * | 5/2014 |
| JP | 2015-204688 | A | 11/2015 |
| WO | WO-2013/183500 | A1 | 12/2013 |

* cited by examiner

HYBRID ELECTRIC VEHICLE

TECHNICAL FIELD

The present invention relates to a hybrid electric vehicle.

BACKGROUND ART

A Patent Literature 1 listed below discloses first and second motor-generators and an inverter of a hybrid electric vehicle. The first and second motor-generators are arranged in close proximity to each other so that their rotation axes are parallel. The first motor-generator mainly generates electricity from an output of an internal combustion engine. The second motor-generator mainly drives drive wheels of the vehicle. In addition, the inverter is also located in close proximity to the first and second motor-generators. The first and second motor-generators are electrically connected with the inverter by wiring harnesses, respectively.

CITATION LIST

Prior-Art Literature

Patent Literature 1: Japanese Granted Patent Publication No. 3843702

SUMMARY OF INVENTION

However, the wiring harness connecting the first motor-generator to the inverter is thick, short, and routed straight because it is for high-voltage AC three-phase power. For this reason, vibrations of the internal combustion engine input to the first motor-generator are transmitted to the wiring harness through a rotor and bearings of the first motor-generator. Furthermore, the wiring harness, which is short and routed straight, does not flex, so that it transmits the vibrations to the inverter. Thus, since the vibrations of the internal combustion engine are transmitted to the inverter, components of the inverter are required to be resistant to the vibrations. This results in a larger size of the inverter.

Therefore, it is an object of the present invention to provide a hybrid electric vehicle capable of suitably suppressing transmission of vibrations of an internal combustion engine to an inverter.

A hybrid electric vehicle according to an aspect of the present invention includes a generator mechanically connected with an internal combustion engine, and a motor-generator mechanically connected with drive wheels. The generator is electrically connected with an inverter by a wiring harness. A generator opening thorough which one end of the wiring harness is inserted is opened on a housing of the generator. An inverter opening thorough which another end of the wiring harness is inserted is opened on a housing of the inverter. The one end of the wiring harness is led out from the inverter opening in a first direction toward the generator. The other end of the wiring harness is led out from the generator opening in a second direction that is different from the first direction. The inverter opening is set off with respect to the generator opening in the second direction, and at least a portion of the wiring harness extends between the generator housing and the inverter housing.

DESCRIPTION OF EMBODIMENTS

Hereinafter, a hybrid electric vehicle according to an embodiment will be explained with reference to FIG. 1 to FIG. 3.

Figure 1:
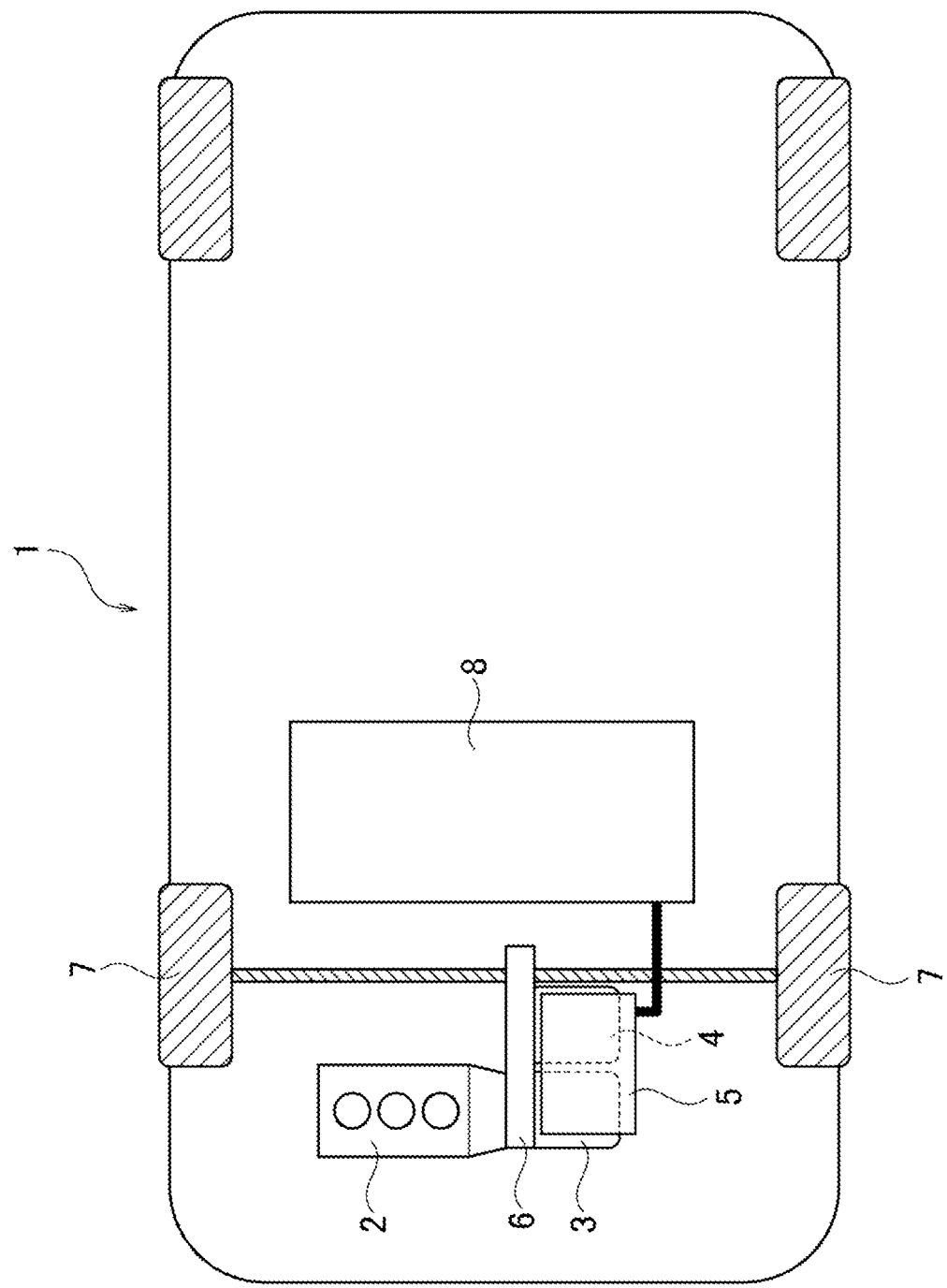
FIG. 1 is a schematic configurational diagram of a hybrid electric vehicle according to an embodiment.
Figure 2:
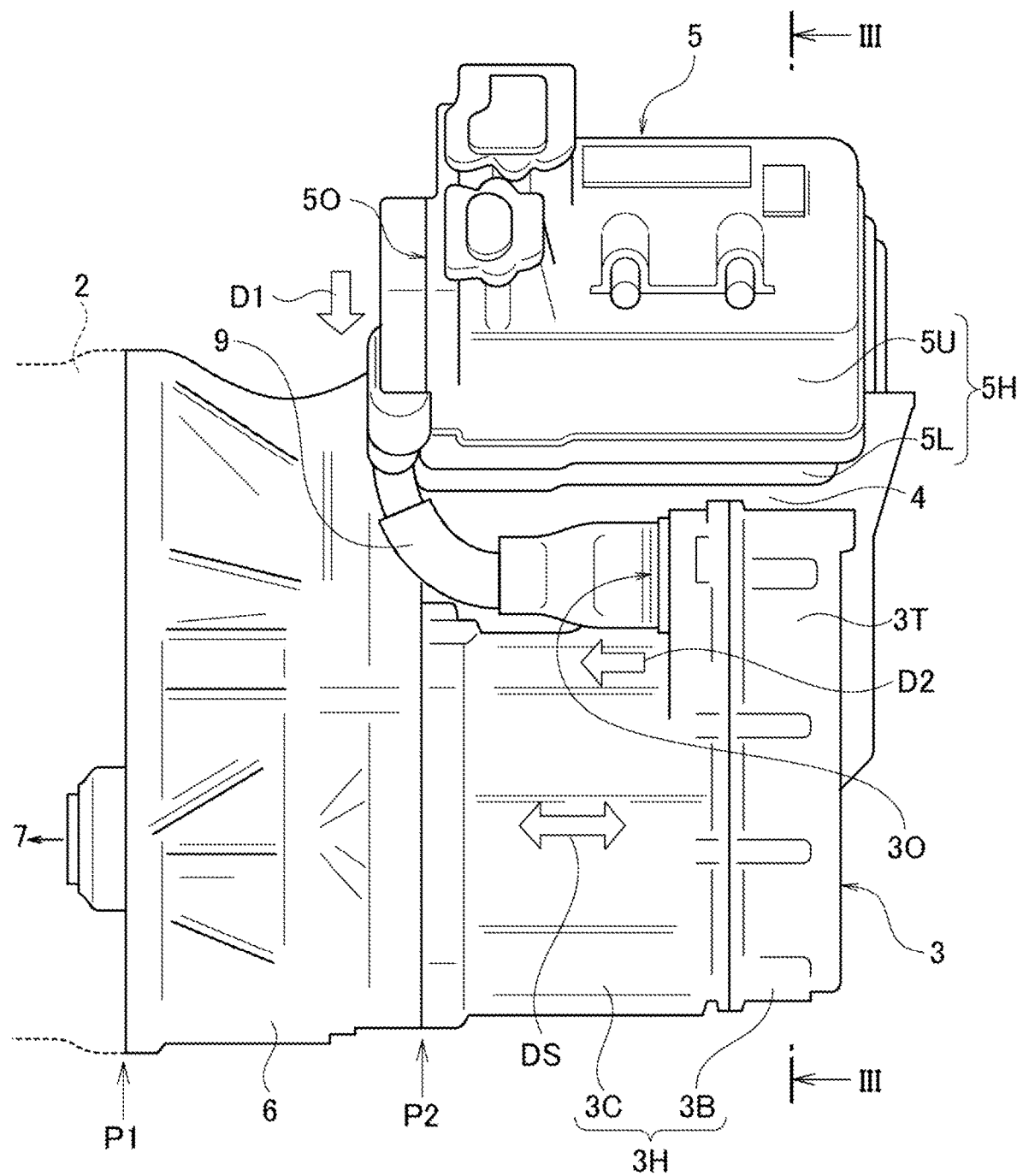
FIG. 2 is a front view showing a generator and an inverter in the hybrid electric vehicle.
Figure 3:
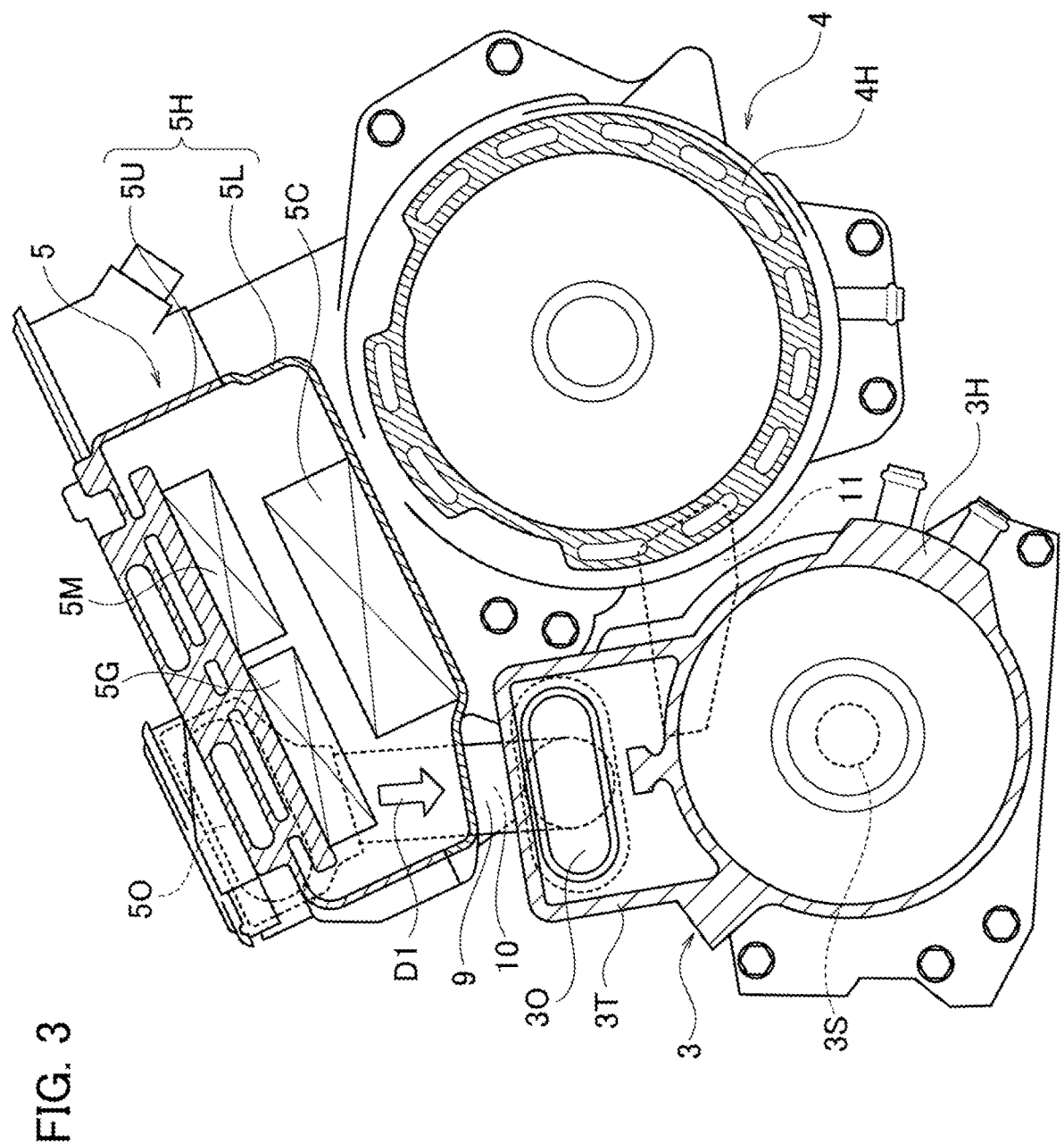
FIG. 3 is a cross-sectional view taken along a line show in FIG. 2.

As shown in FIG. 1 and FIG. 2, the hybrid electric vehicle (HEV) 1 according to the present embodiment is equipped with an internal combustion engine (ICE) 2, a generator 3, a motor-generator (MG) 4, and an inverter 5 in an engine compartment of a front section of the vehicle. The generator 3 is mechanically connected with the ICE 2 with a gearbox 6 interposed therebetween. The MG 4 is mechanically connected with driving wheels (front wheels) 7 with the gearbox 6 interposed therebetween. The inverter 5 is electrically connected with both the generator 3 and the MG 4. The inverter 5 is also electrically connected with a high-voltage battery 8. Although not shown in the drawings, the HEV 1 is also equipped with a low-voltage (12V) battery for auxiliary devices. The low-voltage battery is electrically connected with the high-voltage battery 8 through a DC/DC converter built in the inverter 5. The output from the DC/DC converter charges the low-voltage battery and is supplied directly to the auxiliary devices.

The HEV 1 according to the present embodiment adopts a series hybrid system, and the output (driving force) of the ICE 2 is not transmitted to the drive wheels 7, but to the generator 3 via a speed-increasing gear set in the gearbox 6. In other words, the generator 3 is mechanically connected with the ICE 2. The electricity generated by the generator 3 is supplied to the MG 4 or (and) the high-voltage battery 8 via the inverter 5. The electricity stored in the high-voltage battery 8 can be also supplied to the MG 4. The ICE 2 in the present embodiment does not drive the HEV 1 with its output, but is used only for generating electricity. Therefore, the ICE 2 functions as part of the power generation system.

The output (driving force) of the MG 4 is transmitted to the drive wheels 7 through a reduction gear set in the gearbox 6 and drive shafts. In other words, MG 4 is mechanically connected with the drive wheels 7. Furthermore, the electricity regenerated by the MG 4 during deceleration of the HEV 1 can be also supplied to the high-voltage battery 8 via the inverter 5. As explained above, the gearbox 6 houses the speed-increasing gear set and the reduction gear set, but there is no gear meshing between them.

Next, with reference to FIG. 2 and FIG. 3, the generator 3, the MG 4 and the inverter 5, as well as a wiring harness (hereinafter referred to simply as the harness) 9 that electrically connects the generator 3 to the inverter 5. FIG. 2 shows the generator 3 and inverter 5 as seen from the front of the vehicle. FIG. 2 also shows the gearbox 6, and P1 in the figure is a fastening plane between the ICE 2 and the gearbox 6 and P2 in the figure is a fastening plane between the gearbox 6 and the generator 3. The fastening surface P2 is also a fastening plane between the gearbox 6 and the MG 4. The MG 4 is located at the back of the generator 3 (in FIG. 2). FIG. 3 is a cross-sectional view taken along a line III-III shown in FIG. 2. The inverter 5 is located above the generator 3 and the MG 4, in close proximity to them.

A housing 3H of the generator 3 (a generator housing) is made of aluminum alloy and comprised of a cylindrical main body 3C and an end cap 3B that has a shape formed by integrating a cylinder and a box together. The main body 3C and the end cap 3B are rigidly attached to each other by bolts. The main body 3C is also rigidly attached to the gearbox 6 by bolts. A stator and a rotor of the generator 3 are built in the generator housing 3H. The generator housing 3H rotatably holds a rotary shaft 3S of the rotor via bearings. One end of the rotary shaft 3S extends into the inside of the gearbox 6, and the rotor is rotated by the above-mentioned speed-increasing gear set.

The generator housing 3H basically has a cylindrical shape, but its left-side portion (on the right side in FIG. 2 seen from the front of the HEV 1: on the opposite side to the gearbox 6) has a shape such that a cube is protruded from the cylinder to form a terminal box 3T. The terminal box 3T is protruded toward the inverter 5. Therefore, a space is formed between a right-side portion (on a left side in FIG. 2) of the generator 3 and the inverter 5. Terminals three connected to stator coils are arranged in the terminal box 3T. Inside the terminal box 3T, terminals on one end of the harness 9 are electrically connected to terminals of the generator 3. On the outer surface of the terminal box 3T facing the gearbox 6, a generator opening 3O is opened for leading the one end of the harness 9 out of the generator housing 3H. In other words, the one end of the harness 9 is inserted through the generator opening 3O. Since the generator 3 is a high-voltage three-phase AC generator, the harness 9 is a bundle of plural thick electric wires.

A housing 4H of the MG 4 (an MG housing) is also made of aluminum alloy and has a cylindrical shape. But a flange is formed on at an end of its right-side portion (on the left side in FIG. 2) of the MG housing 4H for being fastened with the gearbox 6. The MG housing 4H is rigidly connected to the gearbox 6 by bolts at this flange. In addition, a portion (a lower housing 5L) of an after-explained housing 5H of the inverter 5 (an inverter housing) is monolithically formed at this flange. A stator and a rotor of the MG 4 are built inside the MG housing 4H. The MG housing 4H holds a rotary shaft of the rotor rotatably via bearings. One end of the rotary shaft is extended into the gearbox 6 to rotate drive shafts through the above-mentioned speed-increasing gear set. A connecting portion of the gearbox 6, which is connected with the drive shaft of the right front wheel 7, is shown on the left side of FIG. 2. This connecting portion is located on a rear side of the vehicle with respect to the ICE 2.

An inverter housing 5H is also made of aluminum alloy and has a box shape. The inverter housing 5H is comprised of an upper housing 5U and a lower housing 5L. The upper housing 5U and the lower housing 5L are rigidly connected to each other by bolts. In other words, the inverter housing 5H is rigidly fixed with the MG housing 4H. Inside the inverter housing 5H, electronic components such as a power module 5G for the generator 3 (a generator power module), a power module 5M for the MG 4 (an MG power module) and a smoothing capacitor 5C are stored. The generator power module 5G is electrically connected with the generator 3 via the harness 9. The MG power module 5M is also electrically connected to the MG 4. Both the generator power module 5G and the MG power module 5M are electrically connected to the smoothing capacitor 5C.

The smoothing capacitor 5C is located closer to the MG 4 than the generator power module 5G and the MG power module 5M. More specifically, the smoothing capacitor 5C is fixed on an inner bottom surface of the inverter housing 5H. The generator power module 5G and the MG power module 5M are arranged side by side on an opposite side to the MG 4 with respect to the smoothing capacitor 5C. More specifically, the generator power module 5G and the MG power module 5M are fixed on an inner top surface of the inverter housing 5H. Since the smoothing capacitor 5C is used by both the generator power module 5G and the MG power module 5M, it is placed in the center between the two in consideration of their wiring lengths.

A portion of the inverter housing 5H closest to the gearbox 6 (i.e. the ICE 2) and farthest from the MG 4 is protruded outward (upward), and an inverter opening 5O is opened in this protruded part for leading the other end of the harness 9 out of the inverter housing 5H. That is, the other end of the harness 9 is inserted through the inverter opening 5O. In other words, the inverter opening 5O is located at a position on the outer surface of the inverter housing 5H that is closest to the ICE 2 and that is on a furthest side of the inverter housing 5H from the MG 4.

Note that the right-side portion (on the left side in FIG. 2) of the generator housing 3H is fixed to the MG housing 4H (the lower housing 5L) by a first bracket 10, and the left-side portion (on the right side in FIG. 2) thereof is fixed to the MG housing 4H by a second bracket 11. The first bracket 10 and the second bracket 11 are made of steel, which is more flexible as metal than aluminum alloy, and are plate materials that can flex slightly. (Vibration durability and damping characteristics of aluminum-based metal [aluminum alloy] is inferior to those of iron-based metal [steel].) Therefore, the first bracket 10 and the second bracket 11 damp vibrations of the generator 3 and thereby hardly transmit them to the MG 4.

Although the harness 9 extends between the inverter opening 5O and the generator opening 3O, a lead-out direction of its one end from the inverter opening 5O is defined as a first direction D1 (see FIG. 2 and FIG. 3) and a lead-out direction of its other end from the generator opening 3O is defined as a second direction D2 (see FIG. 2). The first direction D1 is the direction directing from the inverter opening 5O toward the generator 3. The second direction D2 is parallel to an axial direction DS (see FIG. 2) of the rotary shaft 3S of the generator 3 in the present embodiment. In other words, the first direction D1 and the second direction D2 are different from each other. More specifically, in this embodiment, the first direction D1 and the second direction D2 are perpendicular to each other. Therefore, the harness 9 extending between the inverter opening 5O and the generator opening 3O is necessarily curved and does not extend straight. Since the curved portion of the harness 9 can flex, it becomes possible to deter transmission of vibrations from the generator 3 to the inverter 5 (to absorb the vibrations).

Further, as shown in FIG. 2, the inverter opening 5O is set off with respect to the generator opening 3O opened on the terminal box 3T in the second direction D2. In other words, the position of the inverter opening 5O is different from the position of the generator opening 3O along the second direction D2. That is, the inverter opening 5O and the generator opening 3O are not on the same plane. Therefore, the harness 9 can be made longer, and the transmission of vibrations from the generator 3 to the inverter 5 can be deterred more effectively. In addition, by setting them off from each other, the curvature radius of the harness 9 can be made large. Furthermore, at least a portion of the harness 9 extends through a space between the generator 3 and the inverter 5. Therefore, it is preferable even when the harness 9 is long, because this space can be used effectively. By effectively utilizing this space, the height of the hybrid system unit can be reduced and thereby it can be downsized.

Note that, when the first direction D1 and the second direction D2 are different from each other even if the second direction D2 is not parallel to the axial direction DS, the harness 9 inevitably curves. When the harness 9 curves, the above-mentioned vibrations can be absorbed. However, considering the first direction D1 toward the generator 3 and the protruding direction of the terminal box 3T, on which the generator opening 3O is formed, toward the inverter 5, it is preferable in view of smooth routing of the curved harness 9 that the second direction D2 is parallel to the axial direction DS. Especially in a case where the harness 9 is made long due to the offset of the inverter opening 5O with respect to the generator opening 3O in the second direction D2, it is preferable because the space between the generator 3 and the inverter 5 can be effectively utilized. In this embodiment, it is further preferable to locate the terminal box 3T, on which the generator opening 3O is formed, on the farthest side from the inverter opening 5O along the axial direction DS, because the harness 9 can be made as long as possible.

In addition, the inverter opening 5O is opened on the inverter housing 5H at its outward (upward) protruding portion furthest from the MG 4. This allows the harness 9 to be made longer and the curvature radius of the flexure of the harness 9 can be made large. Since the harness 9 is thick as explained above and thereby is difficult to be flexed, its large curvature radius facilitates the routing of the harness 9. Further, its large curvature radius does not put excessive stresses on the harness 9.

The above-mentioned routing of the harness 9 relates to the positional relationship viewed from the front of the vehicle. Further in the present embodiment, as shown in FIG. 3, the harness 9 is routed such that the smoothing capacitor 5C does not overlap with the harness 9 when viewed from the axial direction DS. Since the smoothing capacitor 5C does not overlap with the harness 9, the inverter opening 5O and the generator opening 3O are arranged in close proximity along the first direction D1 when viewed from the axial direction DS, that is, the inverter housing 5H and the generator housing 3H (the terminal box 3T) can be arranged in close proximity. Further in the present configuration, the bottom of the inverter housing 5H is deformed to avoid the terminal box 3T, and this configuration can be brought precisely because the both don't overlap with each other. This configuration allows the height of the hybrid system unit to be reduced, and thereby the system can be downsized. Note that, even if the inverter housing 5H and the generator housing 3H (the terminal box 3T) are placed in close proximity, the harness 9 is also routed in the second direction D2, and thereby the harness 9 can be made long by being curved to deter the transmission of the vibrations.

As described above, the HEV 1 in this embodiment adopts a series hybrid system. Therefore, the vibrations of the ICE 2 is transmitted to the rotary shaft 3S of the generator 3, which is mechanically connected to the ICE 2. The vibrations are also transmitted to the generator housing 3H and the stator in its inside through the bearings. Further, the vibrations are also transmitted to the harness 9 via the stator coils, but they are absorbed by the harness 9 as explained above. In the present embodiment, the generator housing 3H is not rigidly connected to the MG housing 4H, so that the above-mentioned vibrations are not directly transmitted to the MG housing 4H. Therefore, the transmission of the vibrations of the ICE 2 to the inverter 5 can be suitably suppressed. As a result, the components of the inverter 5 are not required to have excessive vibration resistance.

According to the HEV 1 of the present embodiment, the first direction D1 toward the generator 3 (the lead-out direction of the harness 9 from the inverter opening 5O) is different from the second direction D2 (the lead-out direction of the harness 9 from the generator opening 3O). Therefore, the harness 9 necessarily curves. In addition, the inverter opening 5O is set off with respect to the generator opening 3O in the second direction D2. Therefore, the harness 9 can be made longer. As the result, the harness 9 can absorb the vibrations of the ICE 2 and deter the transmission of the vibrations of the ICE 2 to the inverter 5. Further, at least the portion of the harness 9 extends between the generator housing 3H and the inverter housing 5H. Therefore, even if the harness 9 is long, the space between the generator housing 3H and the inverter housing 5H can be utilized effectively, and thereby the height of the hybrid system unit can be reduced to make it downsized.

Here, the second direction D2 is parallel to the axial direction DS of the rotary shaft 3S of the generator 3, and the generator opening 3O is opened on the terminal box 3T protruding toward the inverter 5. The above-mentioned space between the generator housing 3H and the inverter housing 5H can be formed beside the terminal box 3T, and the harness 9 can be smoothly led out from the generator housing 3H to the space in the axial direction DS. Therefore, the harness 9 can be smoothly routed. Note that the first direction D1 is the direction extending toward the generator 3, and thereby it intersects the second direction D2 (the axial direction DS). Thus, the harness 9 can smoothly flex from the first direction D1 to the second direction D2.

In addition, the inverter opening 5O is opened at a position on the outer surface of the inverter housing 5H that is closest to the ICE 2, and the terminal box 3T is located at a position on the generator housing 3H that is on the farthest side from the inverter opening 5O along the axial direction DS. Therefore, the distance along the axial direction DS between the inverter opening 5O and the generator opening 3O formed in the terminal box 3T can be as long as possible. As a result, the harness 9 can be made long and it can absorb the above-mentioned vibrations effectively.

Further, the inverter opening 5O is located on the inverter housing 5H at a position on the farthest side from the MG 4, and thereby the harness 9 can be made long even along the first direction D1 to absorb the above-mentioned vibrations more effectively. In addition, the curvature radius of the flexure of the harness 9 from the first direction D1 to the second direction D2 can be made large. A large curvature radius makes it easier to route the harness 9 and does not cause excessive stress on the harness 9.

In the inverter housing 5H, the generator power module 5G and the MG power module 5M are arranged side by side on the opposite side to the MG 4 with respect to the smoothing capacitor 5C. In addition, the smoothing capacitor 5C does not overlap with the harness 9 when viewed along the axial direction DS. In other words, the inverter housing 5H and the generator housing 3H (the terminal box 3T) are arranged in close proximity along the first direction D1. Therefore, the height of the hybrid system unit can be reduced, and thereby the system can be downsized.

Note that the present invention is not limited to the embodiment described above. In the above embodiment, as shown in FIG. 2, the inverter opening 5O is arranged on the side close to the ICE 2 and the generator opening 3O is arranged on the side far from the ICE 2 (the inverter opening 5O and the generator opening 3O are opened toward the ICE 2). However, the inverter opening may be placed on the side far from the ICE and the generator opening may be placed close to the ICE (the inverter opening and the generator opening are opened in the opposite direction to the ICE).

Also in this case, the harness 9 can be necessarily curved by making the first direction D1 towards the generator 3 different from the second direction D2. Further, the hybrid system may be mounted at a position other than the front section of the vehicle. Furthermore, also the mounting orientation of the hybrid system is not limited to the orientation in the above embodiment.

REFERENCE SIGNS LIST 1 hybrid electric vehicle (HEV)
2 internal combustion engine (ICE)
3 generator
3H generator housing
3O generator opening
3S rotary shaft
3T terminal box
4 motor-generator (MG)
4H MG housing
5 inverter
5H inverter housing
5O inverter opening
5G generator power module
5M MG power module
5C smoothing capacitor
7 drive wheel
9 wiring harness
D1 first direction
D2 second direction
DS axial direction

The invention claimed is:

1. A hybrid electric vehicle comprising:
an internal combustion engine;
a generator that is mechanically connected with the internal combustion engine with a gearbox interposed therebetween;
a motor-generator that is mechanically connected with drive wheels with the gearbox interposed therebetween; and
an inverter that is electrically connected with the generator and the motor-generator,
wherein the internal combustion engine, the gearbox, and the generator are fastened to one another, in this order, along an axial direction of a rotary shaft of the generator,
wherein the motor-generator is fastened to the gearbox and located at a rear side of the generator,
wherein an inverter housing of the inverter is fixed with an MG housing of the motor-generator,
wherein the inverter and the generator are electrically connected with each other by a wiring harness,
wherein a generator opening thorough which one end of the wiring harness is inserted is formed on a generator housing of the generator,
wherein a portion of the inverter housing of the inverter, which is closest to the internal combustion engine and farthest from the motor-generator, protrudes outward, and an other end of the wiring harness is inserted through an inverter opening that is formed on an outer surface of the protruding portion of the inverter housing so as to be closest to the internal combustion engine and farthest from the motor-generator,
wherein a lead-out direction of the one end of the wiring harness from the inverter opening is a first direction toward the generator,
wherein a lead-out direction of the other end of the wiring harness from the generator opening is a second direction that is different from the first direction,
wherein the inverter opening and the generator opening are opened toward the internal combustion engine and the inverter opening is set off with respect to the generator opening in the second direction,
wherein at least a portion of the wiring harness extends between the generator housing and the inverter housing,
wherein the second direction is parallel to the axial direction,
wherein the generator opening is opened on a terminal box that is formed on the generator housing and protrudes toward the inverter, and
wherein the terminal box is located at a position on the generator housing that is on a farthest side from the inverter opening along the axial direction.

2. The hybrid electric vehicle according to claim 1,
wherein the inverter includes, in the inverter housing, a generator power module for the generator, an MG power module for the motor-generator and a smoothing capacitor that is electrically connected with the generator power module and the MG power module,
wherein the smoothing capacitor is located closer to the motor-generator than the generator power module and the MG power module,
wherein the generator power module and the MG power module are arranged side by side on an opposite side to the motor-generator with respect to the smoothing capacitor, and
wherein the smoothing capacitor does not overlap with the wiring harness when viewed along the axial direction.

* * * * *